Figure 1:
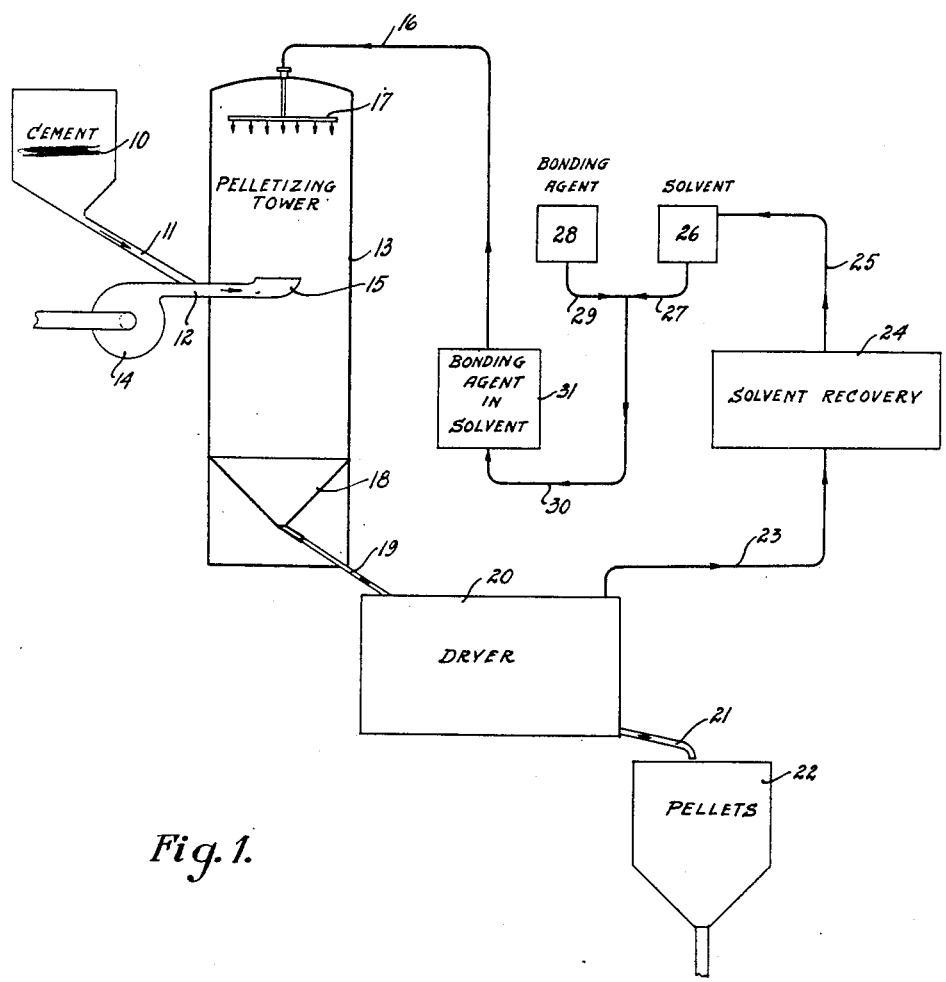

Nov. 12, 1940.    I. C. BECHTOLD    2,221,175
PELLETIZED PORTLAND CEMENT
Filed Jan. 17, 1938    2 Sheets-Sheet 1

Inventor.
Ira C. Bechtold.
Attorney.

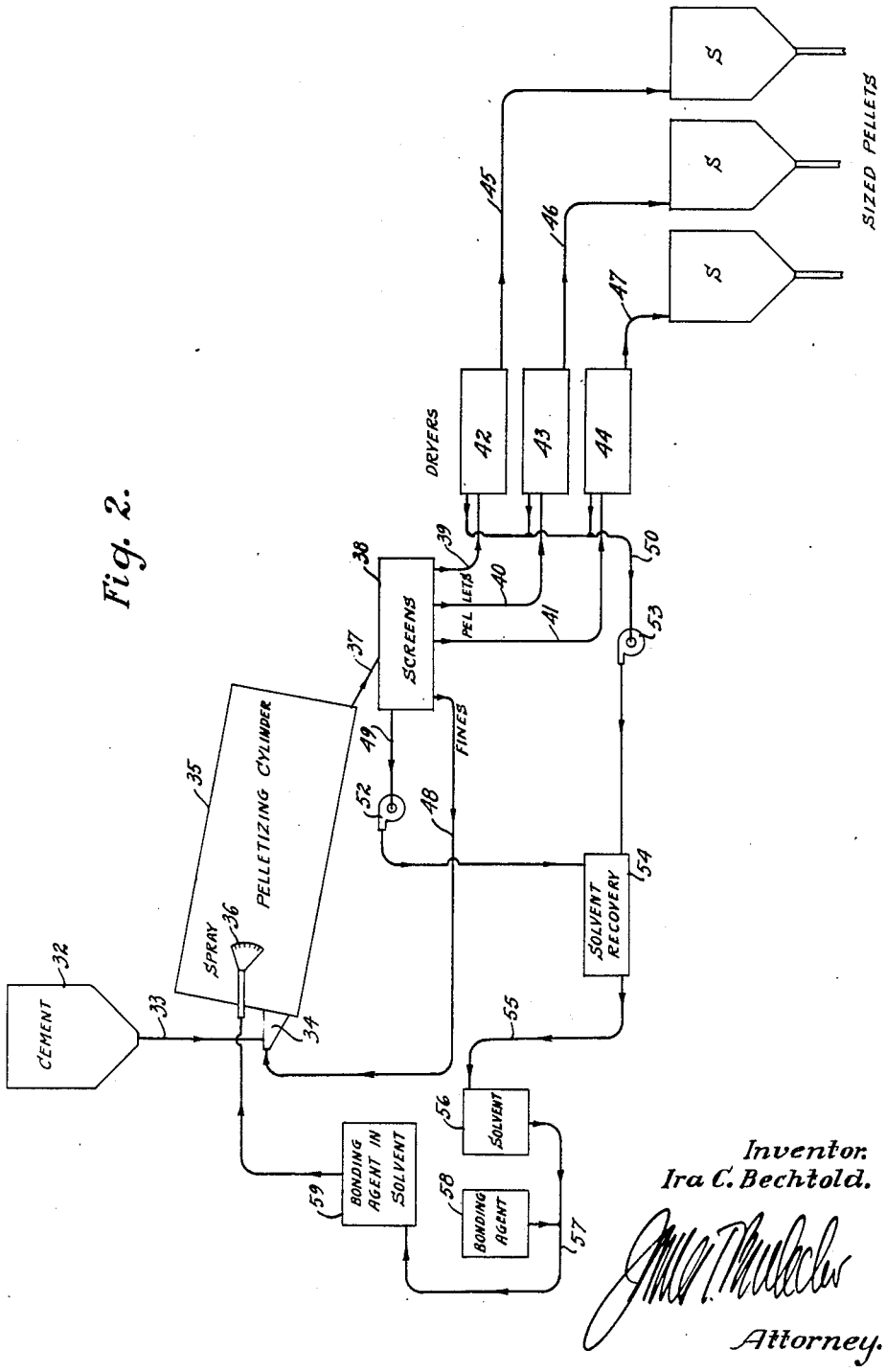

UNITED STATES PATENT OFFICE 2,221,175

PELLETIZED PORTLAND CEMENT

Ira C. Bechtold, Colton, Calif., assignor to California Portland Cement Company, Los Angeles, Calif., a corporation of California Application January 17, 1938, Serial No. 185,309

12 Claims. (Cl. 106—27)

This invention relates generally to Portland cements, and has for its principal object to provide for the manufacture of Portland cement in novel granular or pelletized form which has distinct advantages over the common powdered form. Another main object of the invention is to manufacture such granulized Portland cement having incorporated therein selected admixture materials capable of imparting to the cement certain predetermined desirable properties. It may be mentioned at the outset that in referring to the product as Portland cement, it is intended to include the various hydraulic cements containing Portland cement, although by analysis or other tests a given composition may not conform to standards set for Portland cement. For example, the invention includes such other cements as so-called Portland pouzzolana and plastic cements.

It is commonly recognized that Portland cement in its common powdered form presents many difficulties in handling. Due to its finely divided form the cement presents a dust nuisance which is of considerable consequence in the cement plant, in transit and on the construction site where it is used. Because of the tendency of finely ground cement to pack under its own weight, it is often difficult to handle in bins, conveyer systems, etc. When ordinary cement is packed in the commonly used cloth or paper sacks, a considerable amount of cement is retained by the fibers and folds of the sack when it is emptied. Besides the above mentioned disadvantages, those skilled in the art will recognize many other difficulties commonly encountered in manufacturing and handling Portland cement.

At the present time, technical progress in the cement industry is directed toward grinding cements to greater degrees of fineness. This higher fineness contributes to the difficulties mentioned above and amplifies many of them to serious proportions. Warehouse problems are becoming more difficult, for one reason, among others, that fine cements cake and become lumpy in storage more readily than the old type coarse cements.

In ordinary practice, when it is desired to combine so-called "admixtures" (accelerators, retarders, plasticizers, etc.) with cement in small quantities, such as a few per cent by weight, it is usually necessary to intergrind the admixture with the clinker in the customary grinding procedure. Such method is resorted to and necessitated because of the great difficulty encountered in attempting to uniformly blend small amounts of substances with large volumes of finely powdered cement.

In accordance with the present invention I am able to prepare a cement product which will not be subject to the many difficulties mentioned above and which has marked advantages over the common cement product with respect to composition, manufacturing processes, transportation and final use. I am also able to impregnate finished cement with admixtures in a manner which uniformly distributes them throughout the cement, thus making it possible to grind one type of cement in the clinker grinding process and to avoid the many complications which arise when different admixtures are incorporated with the cement by intergrinding. The present process makes it possible for one type of cement to be used as stock for preparing cements containing a variety of admixtures.

In carrying out the invention I grind Portland cement clinker, together with any desirable admixtures, to a finely divided state just as is done with the common product. Following this grinding I form the finely divided material into granules or pellets of relatively large size as compared with the smallest particles of the cement powder. These pellets are formed by agglutination of the cement particles, i. e. by cementing together a number of particles to form a group or aggregation of particles. Preferably, though not necessarily, the granules may be formed in substantially or roughly spherical shape, and they may be of any suitable size, or range of sizes, in accordance with the type and properties of the cement, and the purposes for which it is to be used. To illustrate, the particle size may range from granules passing a 100 (to the inch) mesh screen, up to any greater size desired. By making the granules in substantially spherical form the cement is made to flow readily and handle easily, and by keeping the granules down to fairly small size they may be made readily disintegrable when wetted. The aggregation of fine cement particles is maintained preferably by means of a relatively weak bond of cementing substance added to the cement as hereinafter described. This bond is so designed that under ordinary conditions of handling, such as conveying, transporting, pouring, etc., the granules will substantially maintain their state of aggregation. However, the granules or pellets may be disintegrated either by mechanical force or dissolution of the binding substance in water, so that the original finely divided particles will be released to act and set in the same manner as ordinary Portland cement. Accordingly, where I refer in the claims to the granules or pellets being capable of becoming or being disintegrated in water, it will be understood that the language used contemplates broadly the property in the pellets as being easily distintegrable for the purpose of hydrating the cement, and that such disintegration may be caused either as a result of the pellets being mixed with water, or by physical force applied during the preparation or mixing of the cement in the usual ways, or by a combination of water mixing and applied force.

Specifically, disintegration of the granules is here shown as resulting from what may be termed disintegration of the binder; and binder disintegration may be by its being broken (being friable) or its bond being broken or released, or by its bond being released as by being dissolved in water.

Under some conditions I may desire to form the bond which maintains the shape and body of the granules by means of a water soluble cementing substance. In this case the granules are disintegrated into their constituent cement particles when the granulated cement comes in contact with the mixing water, the water soluble cementing substance being removed by dissolution in the water. The following may be cited as typical water soluble bonding agents: Water soluble soaps, tannic acid, the alkali salts of iso propyl-naphthalene-sulphonic acid (e. g. the sodium salt), or the esters of sulpho-dicarboxylic acids. These bonding agents may be dissolved in any suitable solvents. For example, the soaps, tannic acid or the alkali salt of iso propyl-naphthalene-sulphonic acid may be dissolved in a suitable member of the ethylene glycol or diethylene glycol ether series. A suitable volatile light hydrocarbon fraction, many of the usual paint thinner solvents, or volatile alcohols may be used as a solvent for the sulpho-dicarboxylic acid ester.

The following are typical of substantially water insoluble bonding agents: rosin or ester gum, either dissolved in a suitable volatile petroleum fraction; chlorinated derivatives of isoprene (e. g. trichloro and tetrachloro derivatives) dissolved in toluene, carbon tetrachloride or ethylene dichloride; soaps, initially soluble or insoluble, dissolved in an ethylene glyco ether. Initially soluble soaps may be converted to insoluble soaps by reaction with lime in the cement.

It will also be understood that I may use a combination of any of the above or other suitable water insoluble or water soluble bonding agents to give a predetermined desired property to the mixture of bonding agents, or to the cement itself. For example, I may render an insoluble bonding agent relatively soluble to the extent that the granules will disintegrate when wetted, by adding a suitable amount of soluble bonding agent. Also I may use as the bonding agent, or in combination with a bonding agent, a substance that will give the cement a predetermined desirable property. Thus tannic acid, for example, may be used to increase the early strength of the cement upon setting after hydration. Soaps or rosin may be used as plasticizers, i. e. to give the cement greater workability. Suitable known and common accelerators, such as finely pulverized or dissolved calcium chloride, may be incorporated in the bonding substance. Various possible admixtures that may be used to obtain desirable properties in the cement or in concrete made from the cement, such as increased impermeability to water, controlled setting time and the like, will be recognized by those skilled in the art.

As indicated, if the desired admixture material is not in itself a suitable bonding agent, I may incorporate it with a suitable bonding agent which is inert with respect to its action upon the properties of the cement or the concrete made from the cement. Also, if a desired admixture happens to be a bonding agent but is present in such small quantity as to be insufficient to provide all the necessary bond between the cement particles, then additional suitable bonding agent may be used with the admixture. It will be readily seen that a combination of admixtures may be incorporated with the bonding agent to secure a given result or combination of results in the properties of the finished cement or the resulting concrete. It may be stated generally of the various bonding materials mentioned above, that they also improve the cement for storage purposes, not only in granulizing the cement particles, but in coating them and rendering the cement water repellent.

It will be understood that any suitable specific method or apparatus may be used in the manufacture of the granulized or pelletized cement according to the teachings of the invention. For example, I may use a "shot tower" process whereby the finely divided cement powder from the grinding mills is introduced into the tower as a suspension in an air stream, and the bonding agent introduced in finely divided form into the cement dust atmosphere within the tower. Other pelletizing or granulizing methods may be substituted in this stage of the process. For example, the pellets may be formed in a revolving cylinder by introducing the binder in droplets into the cylinder and causing the liquid to entrain and bind together the cement particles into balls or pellets as a result of the tumbling action of the cylinder.

Where the use of a solvent for the binding agent is required, I preferably use organic solvent which is sufficiently volatile to be readily removed from the granules. Suitable organic solvents are selected in accordance with their solvent action upon the particular bonding agent being used, and their adaptability to being recovered from the finished product. In order to reduce the cost of the granulizing or pelletizing process, a drying stage is carried out in equipment suited to the recovery of the volatilized solvent. In this manner the solvent may be recirculated and used continuously in a closed system with very little loss.

The invention will perhaps be explained and understood to somewhat better advantage by referring to the accompanying drawings which illustrate, in flow sheet form, certain typical systems for carrying out the invention. These of course are to be regarded as typical and illustrative only. In the drawings:

Fig. 1 diagrammatically illustrates a relatively simple cement pelletizing or granulating system in which the pelletizing operation is conducted in a "shot" or spray tower; and Fig. 2 similarly illustrates another system wherein the granules are formed in a pelletizing cylinder, and includes apparatus for grading the pellets to predetermined sizes.

Referring first to Fig. 1, the finely ground cement is delivered from a suitable source, such as container 10, through conduit 11 into a duct 12 extending into a vertically elongated tower 13 at a suitable point intermediate its upper and lower ends. The cement taken into duct 12 is entrained in a high velocity air stream being forced through the duct by blower 14, and the admixed cement and air are discharged upwardly within the tower through outlet 15.

The selected binder in its solvent, together with any desired admixture, is delivered through line 16 to a suitable spray head 17 within the upper interior of the tower 13, and is showered downwardly within the cement dust atmosphere created by the blower discharge. The spray head 17 may of course be designed to shower down the bonding agent droplets in sizes that will tend to determine the size of the pellets formed. In falling within the tower, the bonding agent droplets gather cement dust particles and agglutinate or cement them into granules or pellets of substantially spherical form. The pellets collecting in the base 18 of the tower are taken through conduit 19 to a suitable drier, conventionally illustrated at 20, wherein the pellets are heated sufficiently to evaporate substantially all the solvent from the binder. The finished pellets pass from the drier through conduit 21 for further disposition, as to storage in bin 22.

Solvent vaporized in the drier 20 is taken through line 23 to a suitable recovery plant 24 wherein the solvent is condensed and treated in any manner desired to recondition it for further use. The recovered solvent is delivered through line 25 to tank 26 from which the solvent is taken through line 27, together with bonding agent supplied from tank 28 through line 29, for delivery by way of line 30 to the bonding agent dissolving or supply tank 31.

In accordance with the system illustrated in Fig. 2, finely ground cement is fed from the supply source 32 through line 33 into the inlet end 34 of an inclined rotatably driven pelletizing cylinder diagrammatically shown at 35. The cement is continuously fed into the cylinder simultaneously with dissolved bonding agent that is sprayed into or dropped upon the cement in the cylinder feed end 34 through nozzle 36. The fine cement particles adhere to the solvent droplets which, during the course of passage through the cylinder, gather the particles into granular form. Due to the cylinder rotation, the granules are continuously subjected to a tumbling action that tends to form them into pellets of smooth surface and substantially spherical form. As in the previously described instance, the size of the bonding agent droplets may be controlled to predetermine within certain limits the size of the pellets formed.

The pellets are discharged through conduit 37 to a suitable screening apparatus 38 wherein they are classified or graded to any suitable number of sizes. The different size pellets thence pass through lines 39, 40 and 41 to the driers 42, 43 and 44, and are finally discharged through lines 45, 46 and 47 to storage bins S. Any fines or unpelletized cement separated by the screening unit 38 may be recirculated through line 48 to the feed end of the pelletizing cylinder. Vaporized solvent may be removed from the screening unit and driers through lines 49 and 50, suction fans 52 and 53 being provided if desired, and passed to the solvent recovery plant 54. The recovered solvent then passes through line 55 to tank 56 to be admixed in line 57 with bonding agent from tank 58 and delivered to the supply tank 59.

It is to be understood that the drawings are merely illustrative of certain typical processes and apparatus for carrying out the invention, and that various changes and modifications may be made without departure from the scope of the invention as expressed in the appended claims. Further, the claims define the invention as a pelletized cement product and while preferably, the bonded particles are formed into a small rounded or ball shape, the description is intended to include other shapes of masses of particles and comprehends any small grain or pill-like aggregation of particles large enough to have non-dusting characteristics.

I claim:

1. A pelletized Portland cement product comprising finely ground cement particles formed into a pellet, the individual particles of said pellets being associated together by a destructible bond whereby they may be readily disassociated.

2. A pelletized Portland cement product comprising finely ground cement particles formed into a pellet, the individual particles of said pellets being associated together by a disintegrable binder whereby the particles may be readily disassociated.

3. A pelletized Portland cement product comprising finely ground cement particles formed into a pellet, the individual particles of said pellets being associated together by a water soluble binder whereby the particles may be disassociated by contact with water.

4. A pelletized Portland cement product comprising finely ground cement particles formed into a pellet, the individual particles of said pellets being associated together by a physically disintegrable and substantially water insoluble binder whereby the particles may readily be disassociated by physical agitation.

5. A pelletized Portland cement product comprising finely ground cement particles formed into a pellet, the individual particles of said pellets being associated together by a physically disintegrable binder whereby the particles may readily be disassociated by physical agitation.

6. A pelletized Portland cement product comprising finely ground cement particles formed into a pellet, the individual particles of said pellets being associated together by a disintegrable resinous binder whereby the particles may readily be disassociated.

7. A pelletized Portland cement product comprising finely ground cement particles formed into a pellet, the individual particles of said pellets being associated together by a disintegrable binder whereby the particles may be readily disassociated, and the binder comprising a substance imparting predetermined properties to the cement.

8. A pelletized Portland cement product comprising finely ground cement particles formed into a pellet, the individual particles of said pellets being associated together by a disintegrable binder whereby the particles may be readily disassociated, and the binder comprising a substance imparting predetermined plastic properties to the cement.

9. A pelletized Portland cement product comprising finely ground cement particles formed into a pellet, the individual particles of said pellets being associated together by a distintegrable binder whereby the particles may be readily disassociated, and the binder comprising a substance imparting predetermined hardening properties to the cement when hydrated.

10. A pelletized Portland cement product comprising finely ground cement particles formed into a pellet, the individual particles of said pellets being associated together by a bond destructible by water, whereby the particles may be readily disassociated and the cement hydrated to form a hardened mass by contact with water.

11. A pelletized Portland cement product comprising finely ground cement particles formed into a pellet, the individual particles of said pellets being associated together by a binder disintegrable by water, whereby the particles may be readily disassociated and the cement hydrated to form a hardened mass by contact with water.

12. A pelletized Portland cement product comprising finely ground cement particles formed into a pellet, the individual particles of said pellets being associated together by a water-soluble binder, whereby the particles may be readily disassociated and the cement hydrated to form a hardened mass by contact with water.

IRA C. BECHTOLD.